May 5, 1931.  M. L. MUELLER  1,804,107
LUMBER DRYING APPARATUS FOR YARD USE
Filed Sept. 16, 1929   3 Sheets-Sheet 1

INVENTOR.
MORITZ L. MUELLER,
BY Shepherd & Campbell
ATTORNEYS

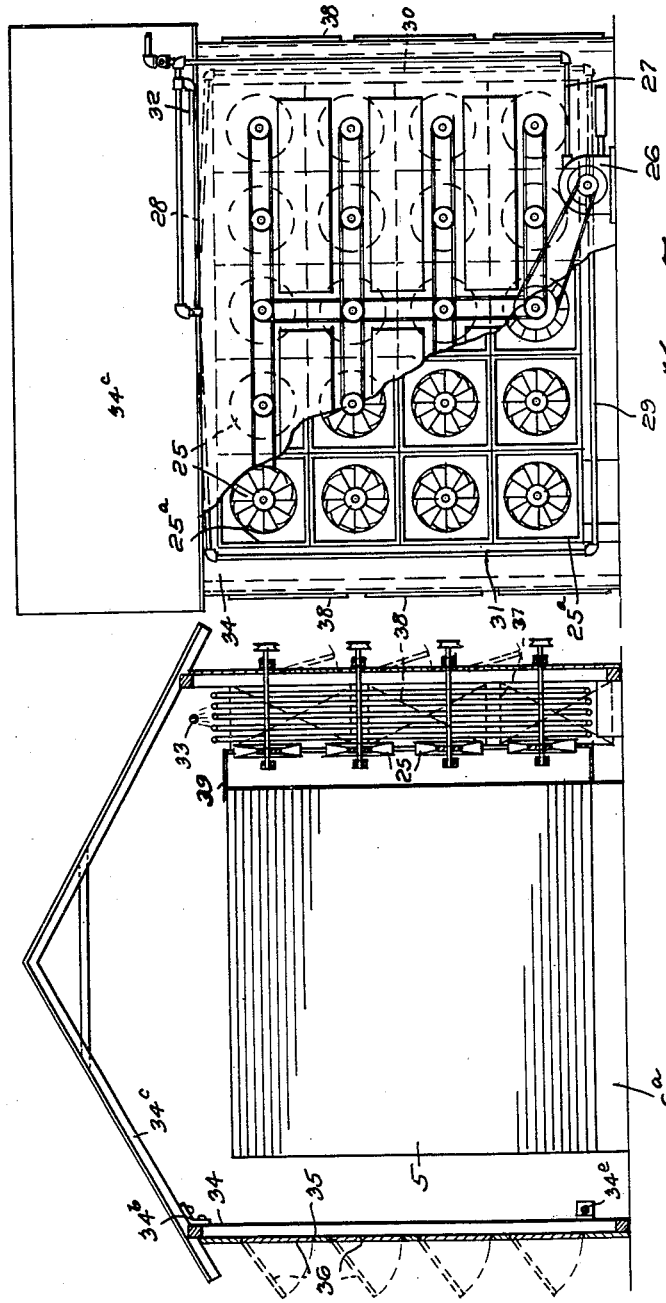

May 5, 1931. M. L. MUELLER 1,804,107
LUMBER DRYING APPARATUS FOR YARD USE
Filed Sept. 16, 1929 3 Sheets-Sheet 3

INVENTOR.
MORITZ L. MUELLER,
BY
ATTORNEYS

Patented May 5, 1931

1,804,107

UNITED STATES PATENT OFFICE

MORITZ L. MUELLER, OF SEATTLE, WASHINGTON

LUMBER-DRYING APPARATUS FOR YARD USE

Application filed September 16, 1929. Serial No. 392,940.

This invention relates to a lumber drying apparatus for yard use, and it has for its object to provide means whereby the drying mechanism may be cooperatively associated with the piles of lumber in the lumber drying yard, instead of transporting the lumber to stationary kilns, in the way now commonly practiced.

A wide variety of methods are used in drying lumber, ranging from piling the lumber in ventilated piles in the open air and allowing the natural atmosphere to dry the lumber, up to the use of various kinds of highly developed drying chambers (commonly called "dry kilns") in which the lumber is piled in well built (usually masonry) buildings and an artificially controlled atmosphere produced by fans, steam coils, steam sprays, water sprays and other devices, is applied to the stock. After the lumber is dried it is removed from the kilns to storage sheds and stored awaiting its sale, while in the open air yard drying it is left where it has stood while drying, until sold.

When lumber is piled in the open air and its seasoning made subject to the natural atmosphere, the drying progresses very slowly, due to the fact that unless the wind is blowing, moisture in the wood, which has risen to the surface, is not removed and soon saturates the adjoining sluggish atmosphere. Staining, souring and other chemical and bacteriological processes result from this sluggish water removal, thus reducing the value of the lumber. At other times, when hot strong winds blow through the exposed lumber piles, the wood dries too fast and under bad shrinkage conditions, value of the lumber is again reduced. Under an average climatic condition, the weather and winds are ideal for the seasoning of the lumber, perhaps fifty percent of the time.

Dry kilns are used to overcome the disadvantages of open air seasoning by eliminating the approximate fifty percent of the time when bad drying conditions exist. However, the expense of complicated highly developed dry kilns makes it necessary that they be used continuously, with the result that no benefit is derived from those periods when the natural atmosphere is such as to provide desirable drying conditions.

Another phase of the use of the expensive, highly developed dry kilns is that the existing types of kilns are designed for the seasoning of the higher grades of lumber, these grades producing a higher margin of profit and consequently making the use of expensive drying methods economically practicable. The lower grades, however, must also be seasoned and because of their lower value and profit, should have special equipment of a less expensive nature designed for their seasoning.

It will be seen from the above discussion that the art of lumber drying will be benefited by the development of a piece of equipment which will have the following characteristics, viz:

(a) That it will utilize the natural atmosphere at all times when it is suitable for the proper drying of lumber.

(b) That it will assist the natural atmosphere at such times as the said atmosphere is closely adapted to the proper drying of lumber, thus utilizing as much as possible these free forces of nature.

(c) That it will be adaptable to use in connection with the usual practice of air drying lumber, in such a way that lumber can be dried in the location in which it is stored, either in part or wholly.

(d) That it will be capable of producing proper drying conditions for lumber in the periods when weather conditions are unsuitable, deriving practically no assistance from the natural atmosphere at such times, but being readily adaptable to quick conversion to permit the use of such natural forces when they again become available.

(e) That it will (by reason of its simplicity and ability to use free natural forces) constitute a machine which can be economically used for drying low grades of lumber which could not be practically handled in more expensive, complicated dry kilns.

In the accompanying drawings:

Fig. 3 is a transverse sectional view of a drying apparatus, showing the same associated with a pile of flat piled lumber, and disposed within a temporary or portable drying house.

Fig. 4 is a side elevation of the structure illustrated in Fig. 3, with certain of the parts broken away.

Like numerals designate corresponding parts in all of the figures of the drawings.

Figure 1:
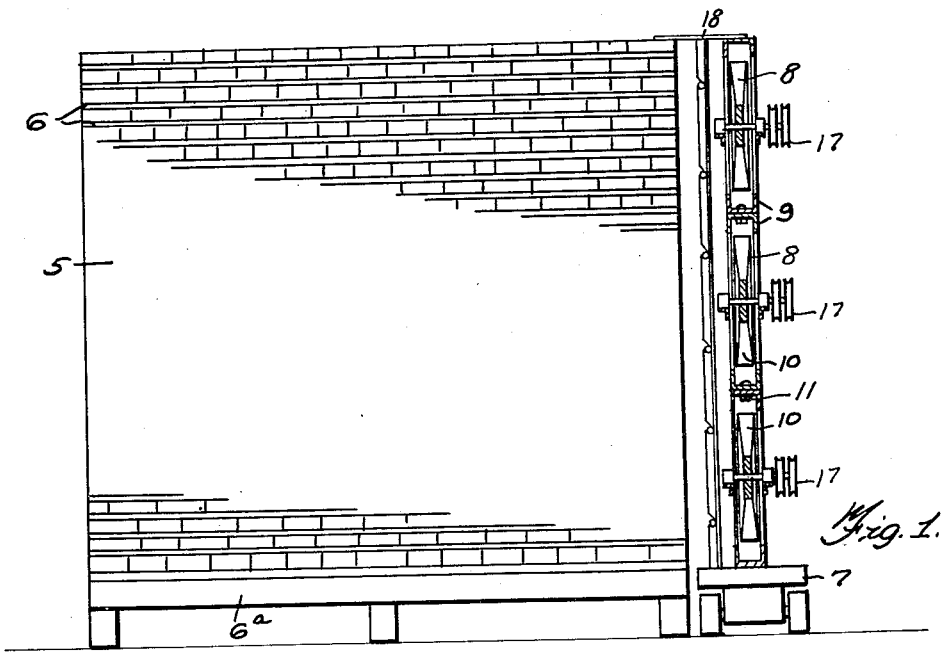
Fig. 1 is a view in transverse section of a portable or temporary drying apparatus illustrating the same, disposed in juxtaposition to a pile of lumber, flat piles in spaced courses.

In each form of the invention I have illustrated a pile of lumber 5, flat piled in spaced courses, and with the usual spacing elements 6 between the several courses of lumber. These piles of lumber are commonly placed upon the suitable pile bottoms 6ª. In the form of the invention illustrated in Figs. 1 and 2, I mount the drying apparatus upon a long narrow wheeled platform 7. The drying apparatus is, preferably, made up of a plurality of separate fan units 8, each unit comprising a supporting frame 9, and any suitable type of fan 10.

In the particular form chosen for purposes of illustration, the fan frames are shown as being of channel formation, and I may bolt or otherwise secure them together, as indicated at 11. By bringing together the necessary number of fan units, I am able to provide a battery of fans which, by proper positioning of the platform 7, with respect to the lumber pile 5, may be disposed in such proximity to a side of the pile as to discharge air into or draw air through the channels formed between the courses of lumber as may be determined by the direction of rotation of the fans. It is common, in the exhaust fans customarily used for the expulsion of heated air from kitchens and the like, to employ fans having individual electric motors as the driving means thereof, and I may use these conventional electric driven fans, but I prefer to drive the fans from a steam turbine 12, the source of supply of which is indicated at 13, and the exhaust line of which is indicated at 14. When the steam turbine is used, I may pass the waste exhaust steam through heated coils 15, that are disposed in the path of the air that is discharged by the fans. Where the steam turbine is employed, the fan may be driven by suitable belts and pulleys, indicated at 16 and 17. After the portable platform has been manipulated to properly position the battery of fans, with respect to the pile of lumber, a flexible curtain 18 is passed about the edge of the pile of lumber and is caused to complementally embrace the edge of the pile of lumber, and the edge of the fan assembly. That is to say, this curtain slightly overlaps the edge of the pile of lumber, and extends to and overlaps the edge of the fan assembly, around all four sides of the same. Thus, the air delivered by the fans cannot travel in any direction other than through the pile of lumber. Any suitable way may be employed for holding the curtain in place, one practicable way being illustrated in Fig. 2ª, where the frames 9 of the fan units are indicated as being provided with suitable threaded openings 9ª, that are adapted to receive thumb screws 20. The curtain 18 has a metal strip 21 clipped upon its outer edge which strip is traversed by the thumb screws, of which there may be as many as are necessary to hold the curtain in place. The inner edge of the curtain, which is preferably made of a suitable flexible fabric, such as canvas, artificial leather, or the like, may be held in suitable engagement with the lumber pile by tacking strips 21 in place to bind the inner edge of the curtain to the lumber pile. However, it will be clear that many ways may be employed of holding the curtain in place, and it is to be understood that the invention is not limited in this respect.

Figure 2:
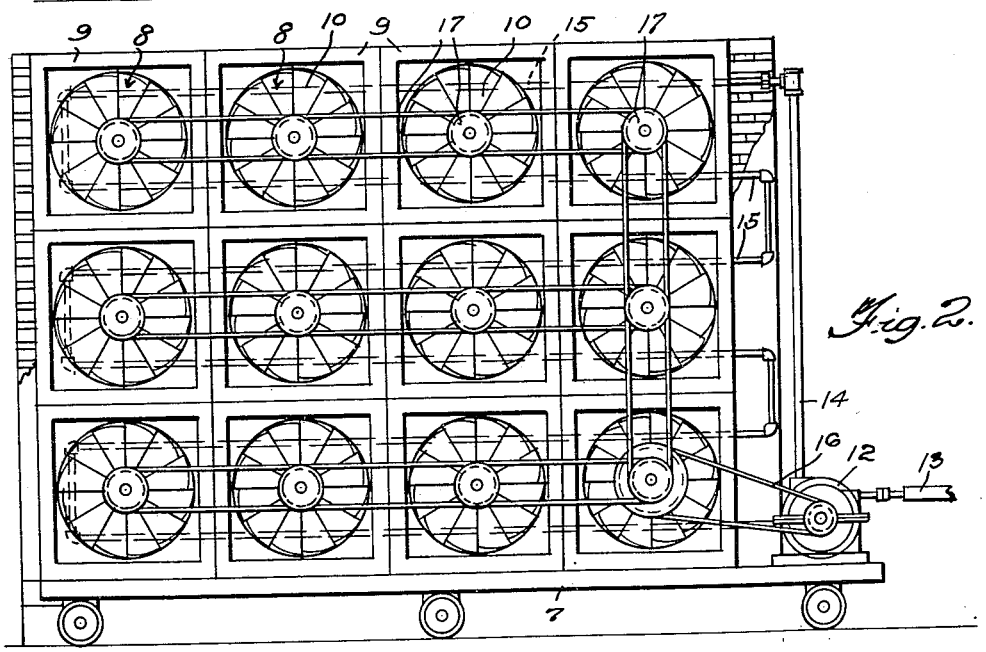
Fig. 2 is an outer face view of the structure of Fig. 1, with certain of the parts broken away, Fig. 2ª is a detail view of a curtain securing means, hereinafter described.
Figure 2A:
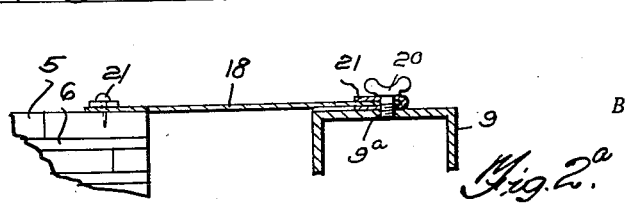

The form of the invention illustrated in Figs. 3 and 4 is, in many respects, like that illustrated in Figs. 1 and 2, in that a battery of fans 25 is employed, said battery being composed of a plurality of independent units 25ª, driven from a common source of power, such as the steam turbine 26. The exhaust pipe for the waste steam from this turbine is indicated at 27, and said pipe supplies steam to heating coils 28, 29, 30 and 31, which extend along the four sides of the battery of fans. A branch pipe 32 supplies steam to the steam spray pipe, indicated at 33, the function of this steam spray pipe being to humidify the air discharged by the fans when additional humidity is required.

The apparatus illustrated in Figs. 3 and 4 is used in conjunction with some suitable form of housing. In the embodiment of the invention illustrated in Figs. 3 and 4, I have shown the apparatus and the pile of lumber 5, as being contained within a small portable or temporary building 34. This building is preferably provided upon each of its sides with openings 35, that are closed by doors 36, and it is provided in each of its ends with openings 37, that are controlled by doors 38. A flexible curtain 39 serves the same function in this apparatus that the curtain 18 serves with respect to the apparatus of Figs. 1 and 2.

It will be observed that, in the case of the apparatus illustrated in Figs. 1 and 2, or in the case of the apparatus illustrated in Figs. 3 and 4, the air may be caused to flow horizontally through the flat piled lumber, and in either direction, at will. Thus, natural air may be caused to flow through the pile of lumber illustrated in Fig. 1, and discharged or wasted, after being used, while in the apparatus illustrated in Fig. 3, the same air may be recirculated to any desired extent and may be suitably conditioned with respect to temperature or moisture during its circulation in the housing 34, and this may be accomplished in conjunction with the piles of lumber in place in the yard. Because of variations in climatic conditions, in various parts of the country, the apparatus may sometimes be set in the open, without a housing of any sort, while in other localities, an inexpensive house, such as that indicated at 34, or the mere use of a tarpaulin over the apparatus and the lumber will be sufficient to yield the desirable results, in bad weather. Where the machine is set adjoining a pile of lumber, as in Fig. 1, it is proposed to roll the machine to its place, already assembled, or to roll the platform to the side of the pile of lumber to be dried, and then bolt together the necessary number of fan units required to approximately coincide with the face of the lumber pile. After the fan units are in place, the flexible curtain is secured in place, thereby forming a closed chamber constituted by the flexible curtain along the four edges, the open face of the pile of lumber on one side, and the fans and their frames or thimbles upon the other side. When the fans are driven in one direction, air is drawn from the drive side of the fans and driven through the lumber pile, and from there is wasted into the atmosphere. Should this air flow oppose the direction of the wind, or should it be necessary to cause the other side of the pile to dry faster, the direction of rotation of the fans is reversed, causing the air flow to be through the pile toward the fans, instead of away from the fans. Should cool weather, with high humidity, either day or night cause the drying of the lumber to slow up, when using unmodified or natural atmospheric air, the exhaust from the engine or turbine drive is turned into the steam coils to thereby warm the air stream. Where electric motors are used to drive the fans, electric heating coils may be used in place of the steam pipes, for heating purposes, it being apparent that the use of electric heating units or hot water heating coils is the equivalent of the steam heat, as far as matter of invention is concerned.

Should the atmosphere be of insufficient humidity, with consequent checking of the lumber, some of the exhaust steam may be turned into the air stream through the spray 33, as live steam, to thereby increase the humidity of the natural air.

The structure illustrated in Figs. 3 and 4 is of particular utility in climates where the air needs to be conditioned through a substantial part of the time. Where the atmospheric conditions are such that the circulation of the natural air does not bring about satisfactory drying, the use of a temporary housing over the piles of lumber in the yard renders it possible to subject such piles in situ to the action of conditioned air, throughout such period of time as may be necessary to effect satisfactory drying of the lumber. It is not to be understood that the mere use of a temporary or portable housing precludes the possibility of securing the economies inherent in the use of natural atmospheric air. Upon the contrary, during those times that the climatic conditions are such that the natural atmosphere is in satisfactory condition, all of the doors 36 and 37 are opened, and the natural air only is drawn in from outside of the house, blown through the house and exhausted from the house, and wasted. If climatic conditions are such as to require only the slight heating of the air, the doors behind the fans are closed, and the doors at the sides of the steam pipes are opened. This draws outside air through the steam coils to the fans, the air being discharged thence through the lumber, and being wasted through openings 35. Should the conditions become such that the foregoing procedure is wasteful, the doors 36 may be closed, either wholly or in part, causing the air discharged from the lumber pile to travel back over and under the lumber, and around the ends of the pile of lumber to the intake sides of the fans, to be re-circulated, thus preventing waste of heat. The air being re-circulated may be conditioned as to humidity by the action of the spray 33. Where climatic conditions are such that the use of housing is rendered desirable, it is my purpose to so construct the housing and the apparatus that they will be readily portable. To this end I may secure the side walls 34$^a$ by means of brackets 34$^b$ to the roof sections 34$^c$, in a manner common in the construction of portable buildings, and I may secure the side walls to the end walls by like brackets 34$^e$, so that the whole may be readily disassembled and moved into operative relation to another pile of lumber, after the drying of one pile has been completed, or these portable buildings may be constructed upon so inexpensive a scale as to render it practicable to leave them in place over a pile of lumber, while it is in storage, awaiting sale or removal, while the apparatus may be moved to another house for continued use. This could be readily accomplished by moving only the side wall that is associated with the apparatus, replacing the same with a side wall having no apparatus associated therewith. This is a point of considerable importance, because it is clear that there would be no particular advantage in drying the pile of lumber and then removing the protecting housing as soon as the drying was completed, if it happened to be raining, at that time. Upon the other hand, it would not be desirable to keep the drying apparatus tied up, awaiting suitable climatic conditions. Under those circumstances, the dried lumber could be maintained in protected and dry condition, while, at the same time, the drying apparatus could be used in the drying of another pile of lumber, by the mere substitution of one removable or portable wall for another. I have used the term "portable or temporary" in this specification, and by that I mean to include buildings that are not only portable in the sense that they may be disassembled, and re-assembled, in conjunction with piles of lumber in place in the drying yard, but buildings which are of such a cheap and inexpensive nature that they are considered to be of a purely temporary character. However, it is not to be understood that the invention is restricted to use in conjunction with any particular type of building, but that I may use it either without any building at all, with a portable building, with a semi-portable building, or, indeed, even with a permanent building. It is probable that in certain localities the climatic conditions would be such that the apparatus may be used to best advantage in conjunction with some type of building throughout a substantial portion of the time.

Figure 5:
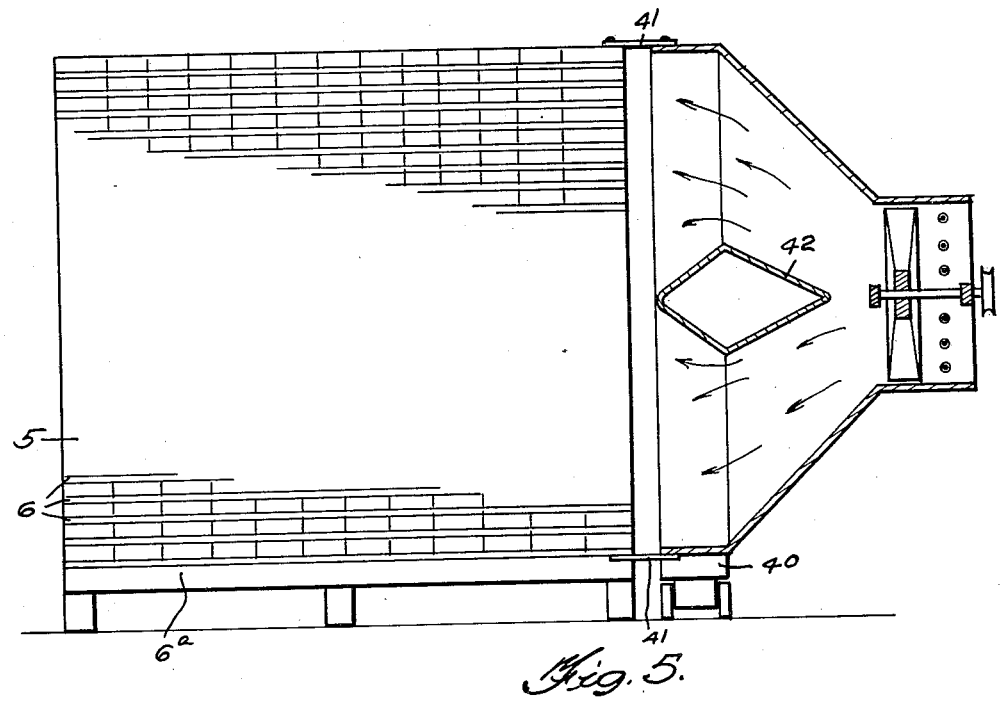
Fig. 5 is a view in transverse section of a further modification of the invention.
Figure 6:
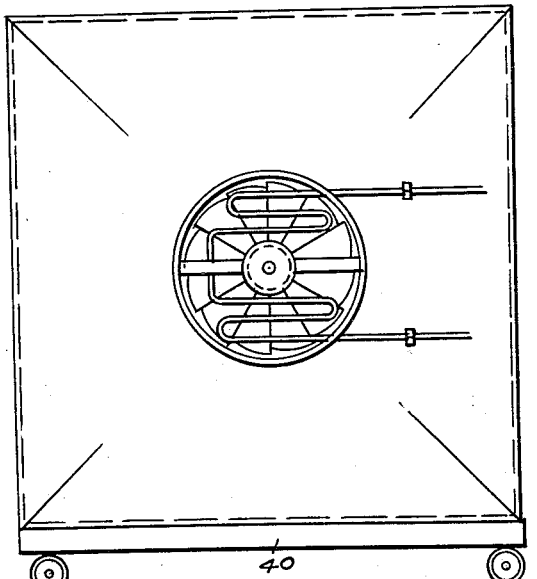
Fig. 6 is a side elevation of the structure illustrated in Fig. 5.

While I, preferably, employ a battery of fans, in order to bring about even distribution of the air over the whole area of the pile, it is possible to secure desirable results through the medium of the structure illustrated in Figs. 5 and 6, wherein a single fan of large capacity is disposed in a portable housing, adapted to be brought into suitable proximity to the pile of lumber, by means of a wheeled truck 40, the edges of said housing which is in the nature of a large funnel, being secured to the edges of a lumber pile, through the medium of a curtain 41, in the manner heretofore described, so that the air moved by said fans will be caused to travel through the lumber pile, in one direction or the other, according to the direction of rotation of the fan. If desired, a deflecting element 42 may be disposed in the housing to cause the air to spread out over the whole area of the pile of lumber, instead of the bulk of the air passing through the center of the pile only.

It is to be understood that the invention is not limited to the precise arrangement set forth, because it is clear that many ways will readily suggest themselves to those skilled in the art of carrying out the principles herein described. Therefore, it is to be understood that the invention includes within its purview whatever changes fairly come within either the terms or the spirit of the appended claims.

Having described my invention, what I claim is:

1. The combination with a wheeled support, of a blast creating mechanism mounted thereon, substantially coextensive in area with a side of a pile of lumber to be dried, and a flexible closure element engaged at one of its edges with the blast creating apparatus, and at its other edge with the pile of lumber.

2. The combination with a support, of a plurality of fan units mounted thereon to constitute a blast creating apparatus substantially coextensive in area with the side of a pile of lumber to be dried, and a flexible closure element engageable at one of its edges with said fan units, and at its other edge with a pile of lumber.

3. A structure of the character described, comprising a portable funnel-like casing, and a blast creating fan at the smaller end thereof, the larger end of said casing being open and adapted to be positioned against the side of a pile of lumber to be dried, and being substantially coextensive in area with the side of said pile, and a flexible curtain for connecting the confronting edges of the casing and lumber pile.

4. The combination with a portable building having blast controlling doors in its walls, of a bodily removable side wall for said building carrying a battery of blast producing fans, as and for the purposes set forth, said battery of fans being of such number and size as to cover substantially the entire side of a pile of lumber to be dried.

In testimony whereof I affix my signature.

MORITZ L. MUELLER.